United States Patent [19]

Neitzel et al.

[11] Patent Number: 5,550,888
[45] Date of Patent: Aug. 27, 1996

[54] METHOD OF DISPLAYING NOTABLY A DIGITAL X-RAY IMAGE AS A VISIBLE IMAGE, AND DEVICE FOR CARRYING OUT THE METHOD

[75] Inventors: Ulrich Neitzel, Hamburg; Hanss-Ingo Maack, Norderstedt; Thomas Pralow, Buchholz, all of Germany

[73] Assignee: U.S. Philips Corporation, New York, N.Y.

[21] Appl. No.: 427,393

[22] Filed: Apr. 24, 1995

[30] Foreign Application Priority Data

May 6, 1994 [DE] Germany ............ 44 15 990.0

[51] Int. Cl.⁶ .................................................. H05G 1/64
[52] U.S. Cl. ............... 378/98.7; 378/98.12; 364/413.13
[58] Field of Search ........................ 378/98.12, 98.2, 378/98.7, 207, 901, 98; 364/413.13, 413.23

[56] References Cited

U.S. PATENT DOCUMENTS 4,825,297  4/1989  Fuchsberger ............ 358/284

4,955,043  9/1990  Nekovar ............ 378/98.7
5,357,549  10/1994  Maack et al. ............ 378/62

FOREIGN PATENT DOCUMENTS 0482712  4/1992  European Pat. Off. .
2952422  8/1980  Germany .
3629409  3/1988  Germany .

*Primary Examiner*—Don Wong
*Attorney, Agent, or Firm*—Jack D. Slobod

[57] ABSTRACT

The invention relates to a method of displaying a spatial distribution of notably an X-ray image whose pixels are associated with digital input image values, a filtering operation being performed on the input image values so as to obtain either low-pass or high-pass image values which are superposed on the input image values, and also relates to a device for carrying out the method. The invention enables the user to preset the contrast and the density of the visible image in conformity with his requirements and independently from one another.

6 Claims, 4 Drawing Sheets

METHOD OF DISPLAYING NOTABLY A DIGITAL X-RAY IMAGE AS A VISIBLE IMAGE, AND DEVICE FOR CARRYING OUT THE METHOD

BACKGROUND OF THE INVENTION

In conventional radiography, visible images are formed by X-ray exposure of a film. The perceptibility of details on such an X-ray film is dependent on the one hand on the detail contrast and on the other hand on the density.

"Density" is to be understood herein as the common logarithm of the quotient of the quantity of light incident on the X-ray film and the quantity of light transmitted by the X-ray film. The meaning of this term is the same as that of the terms "blackening" or "optical density" as used in relevant literature. The density of a film increases as a function of the common logarithm of its exposure, ignoring solarization effects. This dependency of the density on the logarithm of the exposure will also be referred to as "density function" hereinafter.

The contrast C is referred to herein as the differential quotient of the density function, i.e. C=dD/d(log B), where D is the density and B the exposure. The dependency of this (detail-) contrast on the logarithm of the exposure will be referred to hereinafter as "contrast function". Thus, the density function and the contrast function of a film are inseparably linked, i.e. they are correlated.

In digital X-ray exposure systems the X-ray exposure does not yet yield a visible image, but rather a data field consisting of digital input image values which are dependent on the exposure. This data field can be converted into a visible image by means of a suitable output unit, for example a laser imager or a monitor. As is known from the book by Christensen "Introduction to the Physics of Diagnostic Radiology", 3rd Edition, Lea & Febiger, Philadelphia, 1984, the user can preset the increase of the density function and its position by so-called windowing. However, density function and contrast function still remain interdependent (the contrast corresponds to the slope of the density function).

EP-OS 482 712 which corresponds to U.S. Pat. No. 5,357,549, discloses a method of converting digital input image values into a visible image in which the dynamic range in the large-area image zones is compressed while the detail contrasts are maintained. To this end, the input image values are subjected to low-pass filtering. The low-pass image values thus formed are transformed in conformity with a compensation function which produces positive image values for small low-pass image values and negative image values for large low-pass image values. These images values are superposed pixel-by-pixel on the input image values.

It is a drawback that the compensation function to be preset by the user on the one hand changes the brightness or the density of the output image, but on the other hand also affects the image in a manner which cannot be directly anticipated by the user.

Furthermore, DE-PS 29 52 422 discloses a so-called Unsharp Masking method in which high-pass image values are derived from the digital input image values of an X-ray exposure, said high-pass image values being weighted by a weighting factor and then superposed on the input image values. The weighting factor may be a constant, but may also be varied in dependence on the input image values or in dependence on low-pass image values derived therefrom.

In both methods the ratio of the small structures in the image (or the high spatial frequency components) to the large structures in the image (or the low spatial frequency components) is modified in comparison with the non-processed input image, that is to say in such a manner that the small structures are emphasized. This means that the contrast function and the density function are no longer correlated when the contrast function is related to the image areas with the higher spatial frequencies and the density function is related to the image areas with the low spatial frequencies. However, it is not clear to the user whether and how the parameters preset the user, i.e. the compensation function or the weighting factor, influence the contrast and the density of the visible image.

SUMMARY OF THE INVENTION

It is an object of the present invention to provide a method of displaying a spatial distribution of notably an X-ray image whose pixels are associated with digital input image values, in which the user can simply adapt the image character as required.

This object is achieved by taking the following steps:

entering the contrast function and the density function desired for the display, processing the input image values in two signal channels, summing the image values formed in the signal channels, and applying the sum image values thus formed to an output unit for forming a visible image, filtering the input image values in one signal channel in order to generate low-pass or high-pass image values, and performing complementary filtering, or no filtering, in the other signal channel, transforming the image values formed in the other signal channel, or the sum image values, by means of a first transformation function, and transforming the image values formed in the one signal channel by means of a second transformation function, the two transformation functions being derived from the preset density function and contrast function in such a manner that in the image displayed the fine contrast is in conformity with the contrast function and the brightness, or density, of the larger image structures varies in conformity with the density function.

"Complementary filtering" is to be understood to mean herein a filtering operation which produces, in conjunction with the filtering operation in the other signal channel, the input image composed of the input image values. For example, when a low-pass filtering operation is performed in the one signal channel, a high-pass filtering operation must be performed in the other signal path, that is to say with the same filter kernel. Pixel-by-pixel summing of the low-pass and the high-pass image formed by these two filtering processes would produce the input image consisting of the input image values.

The invention is based on the following considerations. Because a filtering operation is performed in at least one of the two signal channels, the high-pass and low-pass components in the image to be displayed can be influenced to a different extent, i.e. by a suitable choice of the transformation functions, in such a manner that the contrast function preset by the user occurs in the high-pass components of the image, i.e. in its fine or spatially small details, and that the desired density function occurs in the low-pass components of the image, i.e. in its coarse or spatially large structures. The transformation functions required for this purpose can always be derived from the preset contrast and density functions. The user can thus directly preset the contrast and density (or brightness) of the image, that is to say image parameters which are directly evident to the user, as opposed to parameters such as the compression curve or the accentuation factor in the known method whose effect on the image character cannot be readily predicted.

In a preferred embodiment of the invention, the first transformation function corresponds to the density function entered, the second transformation function corresponds to the contrast function entered, high-pass image values are derived from the input image values, the high-pass image values are multiplied by a weighting factor whose dependency on the low-pass image values corresponds to the second transformation function, low-pass image values are derived from the input image values, the low-pass image values are subjected to a transformation in conformity with the first transformation function, the transformed low-pass image values and the high-pass image values multiplied by the weighting factor are superposed pixel-by-pixel.

The special advantage of this version, in which a high-pass filtering operation is performed in one signal channel and a low-pass filtering operation in the other signal channel, resides in the fact that the two transformation functions need not be derived from the preset contrast and density functions by a complex and intricate calculation but are identical thereto. The low-pass components are transformed in the one signal channel by a transformation function which corresponds to the density function entered by the user, and in the other signal channel the high-pass image values are multiplied by a weighting factor whose dependency on the input image values, or the low-pass image values, corresponds to the contrast function preset by the user (this multiplication by the weighting factor represents the second transformation which, however, is dependent on two parameters, i.e. the high-pass image values on the one hand and the input or low-pass image values on the other hand).

It is not necessary for the input image values in both signal channels to be subjected to a filtering process; it suffices when a filtering operation (low-pass or high-pass) is performed in only one of the two signal channels.

In a version of the method in accordance with the invention which is based thereon:

the first transformation function is formed by calculation of the integral over the contrast function entered and by adaptation of the integral to the maximum density or brightness of a visible image, the second transformation function is determined from the difference between the first transformation function and the preset density function for each time the same density or brightness, from the input image values there are formed low-pass image values which are transformed in conformity with the second transformation function, the transformed low-pass image values are superposed on the input image values, and the sum image values thus produced are subjected to a transformation in conformity with the first transformation function.

In this version the dynamic range of the large-area structures (low spatial frequencies) is compressed. Should the preset density distribution by chance correspond to the correlated density function, no transformation of the low-pass image values will take place, i.e. the transformed low-pass image values have the value zero. In that case merely the input image values are transformed in conformity with the first transformation function which corresponds to the correlated density function. When said condition is not satisfied, in dependence on the deviation between the density function entered and the correlated density function, the transformation produces low-pass image values which deviate from zero, so that the dynamic range is changed (usually compressed) for the large-area image areas (low spatial frequencies).

In a further version of the invention:

the first transformation function corresponds to the preset density function, the second transformation function is determined from the difference between the preset contrast function and the correlated contrast function, high-pass image values are derived from the input image values, the high-pass image values are multiplied by a weighting factor whose dependency on the low-pass image values corresponds to the second transformation function, the input image values are subjected to a transformation in conformity with the first transformation function, and the transformed input image values and the high-pass image values multiplied by the weighting factor are superposed in a pixel-by-pixel manner in order to form the output image values.

In this context a correlated contrast function is to be understood to mean the contrast function which is correlated to the density function entered by the user, i.e. corresponds to the differential quotient of this density function. Analogously, a correlated density function is to be understood to mean the density function which is correlated to the contrast function entered by the user, i.e. corresponds to the integral over the contrast function.

In the latter version the high-pass image values are multiplied by a, usually non-constant, weighting factor as in the Unsharp Masking method. When the correlated density function corresponds by chance to the preset density function, the weighting factor is zero and the desired contrast function and density function are then achieved by transforming merely the input image values in conformity with the preset density function. If this condition is not satisfied, the weighting factor results from the difference between the preset contrast function and the correlated contrast function.

In a version of the invention which is suitable for X-ray imaging systems assumed to produce digital image values which are proportional to the dose or the exposure in the relevant pixels, the input image values are derived from these image values by a logarithmic transformation.

A device for carrying out the method is characterized in that it comprises a) a detector device for converting the location-dependent radiation intensity of an X-ray image into a data field consisting of digital input image values, b) means for separately entering a density function and a contrast function, c) means for deriving a first transformation function and a second transformation function from the contrast function and the density function, d) a first and a second channel for processing the input image values, e) a spatial filter in the one signal channel for generating low-pass image values or high-pass image values from the input image values, f) a transformation device which processes the filtered image values so as to transform the low-pass or high-pass image values in conformity with the one transformation function, g) a superposition device for superposing the image values from the two signal channels, associated each time with the same pixel, in order to form sum signals, h) a second transformation device for transforming the image values present in the second signal channel or on the output of the superposition device in conformity with the other transformation function, and i) an image output unit which outputs the sum image values as a visible image.

BRIEF DESCRIPTION OF THE DRAWINGS

The invention will be described in detail hereinafter with reference to the drawings. Therein.

DETAILED DESCRIPTION OF THE PREFERRED EMBODIMENTS

Figure 1:
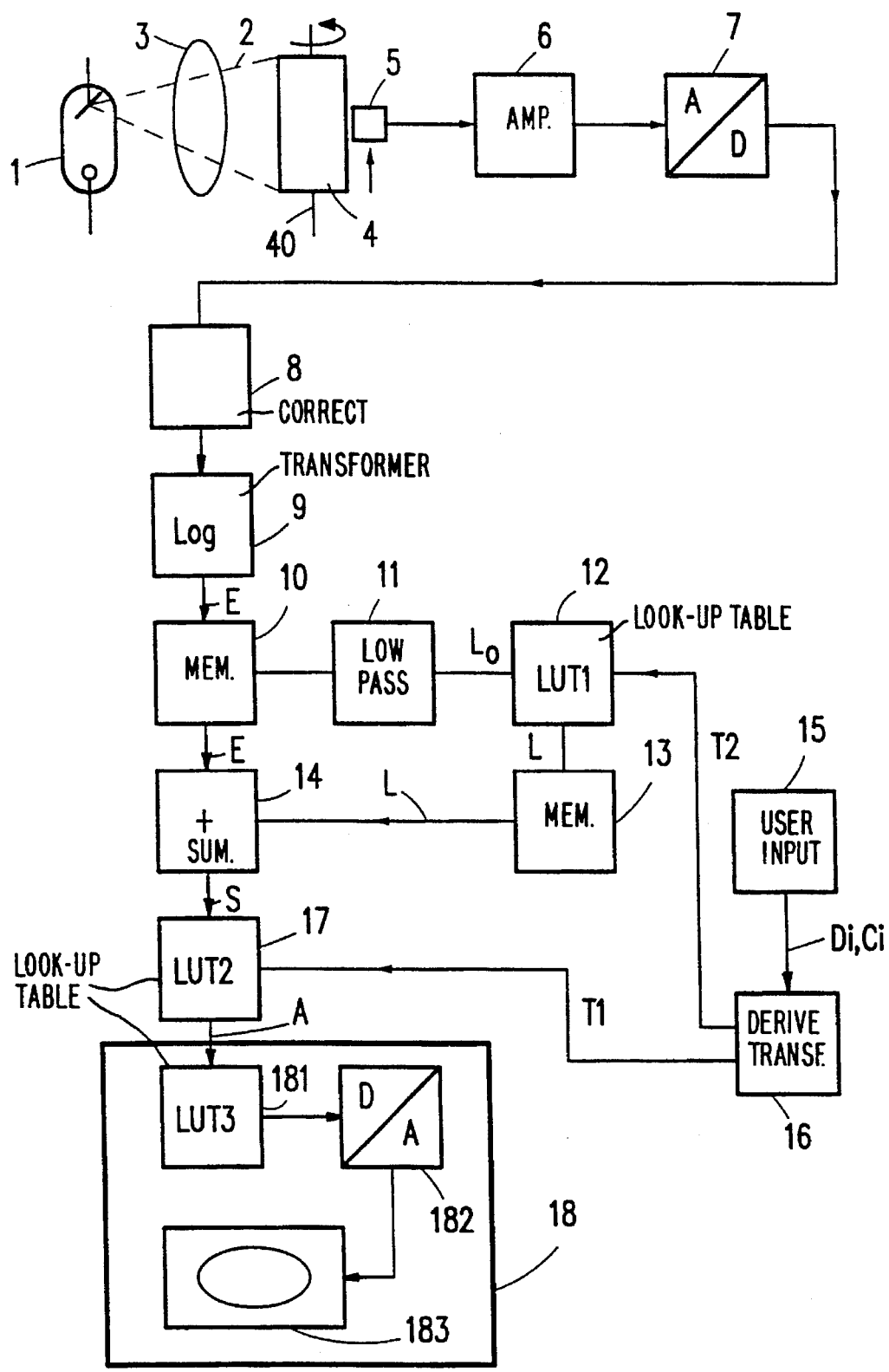
FIG. 1 shows a block diagram of an X-ray device whereby a first version of the method of the invention can be carried out.

Referring to FIG. 1, an X-ray source 1 emits an X-ray beam 2 which irradiates a patient 3. The X-ray relief thus produced is converted into an electric signal by an image detector 4, 5, the variation in time of said electric signal corresponding to the spatial variation of the X-rays behind the object. The image detector comprises a cylindrical drum 4 which is rotatable about an axis 40 and is coated with a photoconductor, preferably selenium. The X-ray relief is converted into a charge pattern on the photoconductor, which charge pattern is read, during rotation of the drum, by means of an appropriate sensor 5 which is arranged so as to be displaceable parallel to the axis of rotation 40, said charge pattern thus being converted into an electric signal.

The output signal of the sensor 5 is applied to an amplifier 6 and is subsequently converted into a sequence of data words having a width of, for example 16 bits by an analog-to-digital converter 7. These data words are proportional to the exposure or the dose D produced in the individual pixels by the X-ray exposure. The digital data words are subjected to a series of processing steps, represented by single blocks in FIG. 1, during an image processing operation in an image processor.

During a first step (block 8) the data words are corrected so as to eliminate all detector-specific errors from the data words, so that subsequently a data set wherefrom such errors have been removed is available. The individual data words of the data set thus corrected are subjected to a logarithmic transformation (block 9), preferably by means of a look-up table, in conformity with the formula $E=\log D/D_0$, where $D_0$ is a reference dose which is derived in known manner from the contents of the image, for example by histogram analysis. The data words E thus produced are proportional to the logarithm of the dose D or the exposure occurring in the individual pixels. These data words will be referred to as input image values E hereinafter.

The input image values E are stored in a memory 10 and subjected to a low-pass filtering operation (block 11). To each pixel there is assigned a low-pass image value $L_o$ which corresponds to the arithmetical mean value of the input image values of those pixels which are situated within a kernel, being a preferably square area of the X-ray image in the centre of which the pixel is situated for which the low-pass image value is to be formed. The kernel should be substantially larger than the fine structures of relevance to the medical diagnosis and should correspond, for example to an area of 3 cm×3 cm. Low-pass image values $L_o$ are thus successively formed for all pixels.

The low-pass image values $L_0$ are subsequently subjected to a transformation in conformity with a transformation function $T_2$ (block 12). In a manner yet to be described, the transformation function is dependent on the contrast function $C_i$ and the density function $D_i$ which can be preset by the user, independently of one another, and wherefrom the transformation function $T_2$ is calculated (block 16). Transformation is preferably performed by means of a look-up table which interprets the input values, in this case bring the low-pass image values $L_o$, as addresses at which the transformed image values L are stored.

The user can preset the functions $C_i$ and $D_i$ by means of a suitable input unit, for example a keyboard or a graphic tablet. However, it would in principle also be possible for the user to preset the density function and the contrast function by selecting a contrast function and a density function each time from a group of contrast and density functions already stored in a memory.

The values L thus represent the transformed low-pass image values. They are stored subsequent to the transformation (block 13). The stored input image values E and the stored transformed low-pass image values L are summed pixel-by-pixel, so that the sum image value S formed corresponds to the sum of the input image value E and the transformed low-pass image value L each time assigned to the same pixel.

The sum image values S thus formed are subjected to a transformation in conformity with a transformation function $T_1$. The transformation function $T_1$ is derived block 15), in a manner yet to be described, from the contrast function $C_i$ preset by the user (block 16). The output image values A resulting from this transformation are applied to an image output unit 18, for example a laser imager which derives therefrom a visible image whose density is linearly dependent on the magnitude of the output values A.

The effect of the described processing steps is dependent on the dimensions of the structures in the X-ray image. Small structures which are substantially smaller than said kernel have no effect on the low-pass image values $L_o$ or L. They have an effect only on the input image values E and are influenced only by the transformation performed in conformity with the transformation function $T_1$ in block 17. This transformation function in principle corresponds to the density function correlated to the preset contrast function. Therefore, for the fine structures the contrast relating to the contrast curve $C_i$ preset by the user is obtained.

The coarse structures are not suppressed by the low-pass filtering operation. Therefore, these structures are influenced by the transformation function $T_1$ as well as by the transformation function $T_2$. The transformation function $T_2$ is chosen so that for the coarse image structures the desired density variation $D_i$, or the density variation preset by the user, is obtained after this transformation and summing with the input image values E (block 14) and after the further transformation (block 17).

The extraction of the transformation functions $T_1$ and $T_2$ from the density function $D_i$ and the contrast function $C_i$ preset by the user will be described in detail hereinafter with reference to the FIGS. 2 and 3.

Figure 2A:
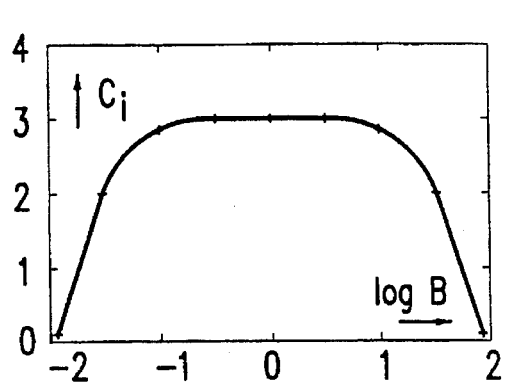
FIGS. 2a to 2e illustrate various functions relevant to the method of the invention.
Figure 3:
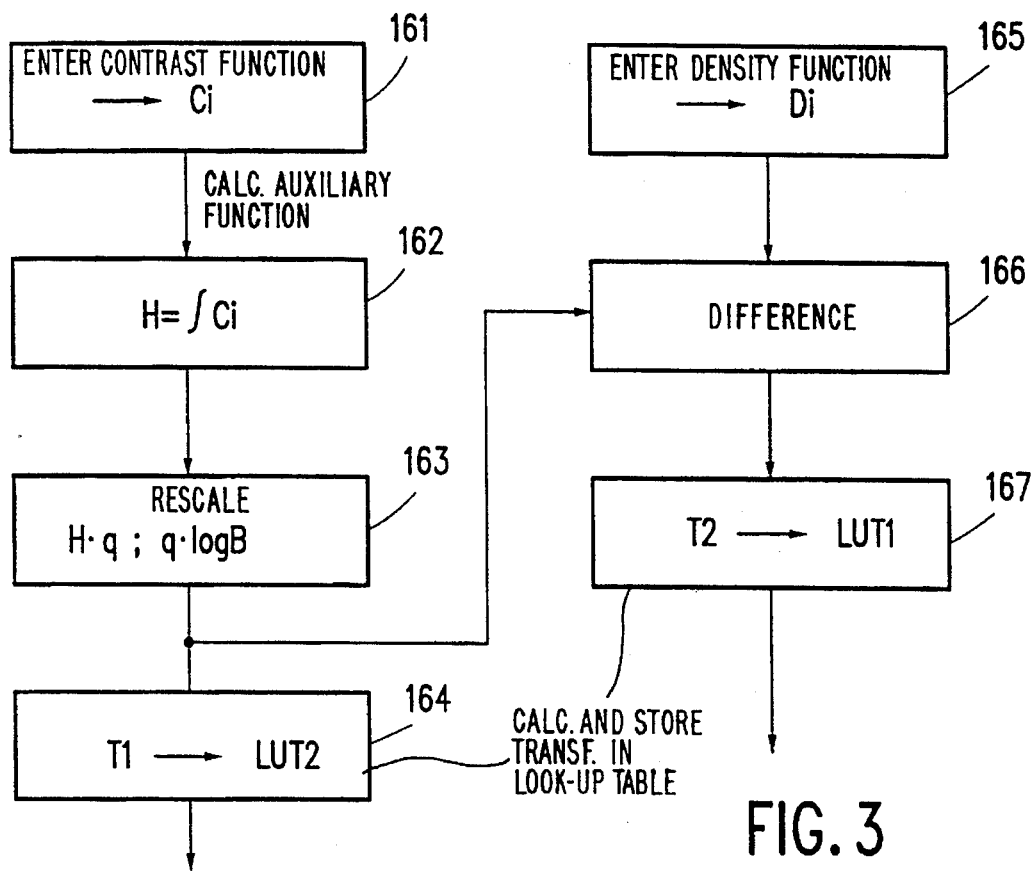
FIG. 3 shows a flow chart for deriving the two transformation functions from the preset contrast and density function for the version of FIG. 1.

In conformity with the diagram of FIG. 3, the user first enters the contrast function $C_i$ (block 161). FIG. 2a shows such a contrast function $C_i$, i.e. the contrast as a function of the logarithm of the exposure or dose normalized to a reference value, or as a function of the input image values E, because a linear relationship exists between the exposure B and the image values. It is merely necessary for the user to preset the contrast function at a few points which are denoted by crosses in FIG. 2a. The variation of the contrast function as represented by solid lines is obtained therefrom by suitable smoothing methods, for example by way of a cubic spline interpolation.

Figure 2B:
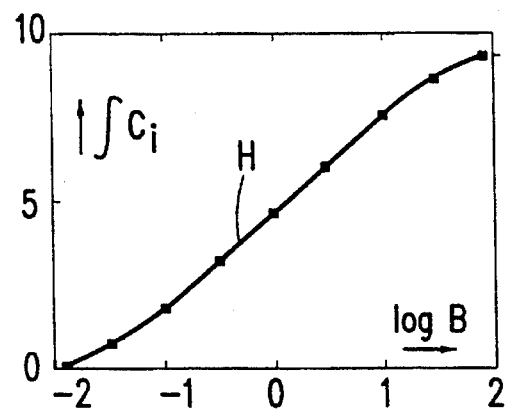

During the second processing step (block 162) an auxiliary function H is calculated which corresponds to the correlated density function, i.e. the integral over the contrast function from a very low value of log B (for example, <−2), or from E, to the relevant value of log B (or E). This auxiliary function is shown in FIG. 2b. It represents the variation of the density which would exist on a film if its contrast were to vary in conformity with the contrast function shown in FIG. 2a. However, such a density variation is impossible for two reasons:

a) in the example density values of almost 10 are obtained. On the one hand such high density values can hardly be attained by means of customary image output units. On the other hand, the human eye could no longer recognize any image information in such high density ranges.

b) the function H represents only the density function associated with the contrast $C_i$ in accordance with FIG. 2a, but usually not the density function $D_i$ preset by the user via the input unit 15 (FIG. 1).

During the next step (block 163) rescaling or compression takes place, i.e. adaptation of the function H to the relevant density range, without the gradient of the curve being modified. To this end, the ordinate values H as well as the abscissa values log B are multiplied by a factor q which is formed as follows:

$$q = (D_{max} - D_{min}) H_{max}.$$

Therein, $D_{max}$ and $D_{min}$ are the highest and the lowest density, respectively, which can be achieved by means of the image output unit, and $H_{max}$ is the maximum value of the curve H in FIG. 2b. For the rescaled ordinate values $T_1$ it then holds that $$T_1 = H/q + D_{min}.$$

Figure 2C:
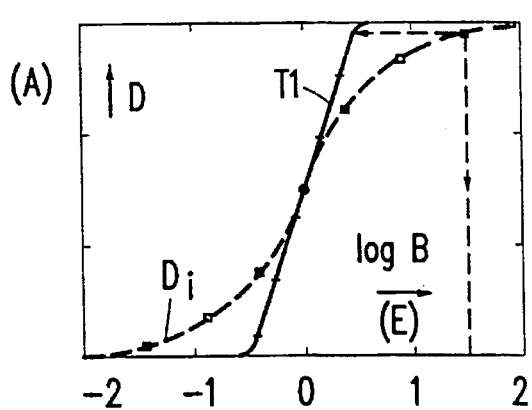

Thus, the function $T_1$ which is represented by solid lines in FIG. 2c is obtained, which function corresponds to the curve H in respect of slope (FIG. 2b has an ordinate scale which differs from that of FIG. 2c!) but is limited to a value range of from approximately −0.6 to +0.6 (in comparison with −2 to +2 for the curve H in FIG. 2b).

The curve $T_1$ represents the transformation function whereby the values S must be transformed in order to obtain the values A. A condition in this respect is that the values S are limited to the range in which the transformation function $T_1$ is defined. During the next step, the transformation function $T_1$ thus calculated is stored in the look-up table 17 (block 164), so that with each of the sum image values S an output image value A is associated in conformity with this transformation function.

As has already been described, the curve $T_1$ corresponds to the density function which can be derived from the preset contrast function $C_i$ (FIG. 2a), provided that this calculated density function (H) is compressed (or expanded) in respect of its ordinate and abscissa values in such a manner that the density range is adapted to the inherent density range of the image output unit 18. The function $T_1$ thus determined, however, usually does not correspond to the density function desired by the user.

The density function $D_i$, i.e. the density in dependence on the logarithm of the exposure (dose) divided by the reference value, or in dependence on the input image values E or the sum image values S, is preset by the user (block 165) in the same way as the contrast function $C_i$. The density function entered by the user is represented by dashed lines in FIG. 2d. It appears that $T_1$ clearly deviates from this density function $D_i$. In order to compensate for this deviation, the difference between the abscissa values of $T_1$ and $D_i$ is determined as a function of the relevant abscissa value of $D_i$. This is indicated in FIG. 2c by dashed lines for a point on the curve $D_i$ with an abscissa value of approximately 1.5. The abscissa difference between $T_1$ and $D_i$ at this point amounts to approximately −1, so that an ordinate value of −1 is obtained for the desired function with an abscissa value of +1.5. This value is denoted by a dashed line in FIG. 2d.

Figure 2D:
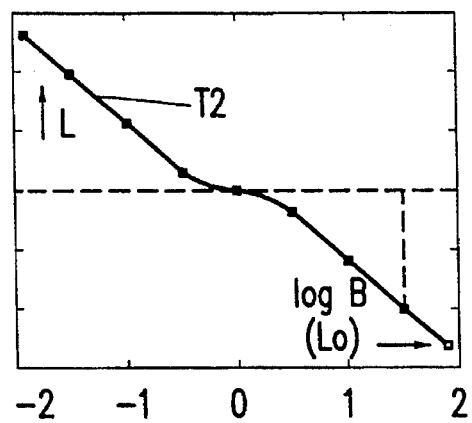

When this step, denoted by the block 166, is repeated for all points on the curve $D_i$ or $T_1$, the variation represented by the curve $T_2$ in FIG. 2d is obtained. This curve represents the transformation whereto the low-pass image values $L_o$ must be subjected. The transformation function $T_2$ is loaded into the look-up table 12, so that it is achieved that for large-area structures the relationship between the input image value E and the output image value A corresponds to the curve $D_i$.

As has already been stated, the image output unit 18, for example a laser imager, converts the output image values A into a visible image whose density is linearly dependent on the output image values A. Generally speaking, however, the relationship between the intensity of the laser beam and the density of the image produced thereby is non-linear. In order to compensate for such non-linearity the image output unit 18 comprises a further look-up table 181 whose output signal is applied, via a digital-to-analog converter 182, to a unit 183 which controls the exposure of the visible image to be generated in conformity with the analog output signal. The sum signal S is thus successively subjected to a transformation in conformity with the transformation function $T_1$ and a further transformation in conformity with the inherent characteristic of the image output apparatus 18. To those skilled in the art it will be evident that the two successive transformations can be combined to a single transformation, with a correspondingly modified transformation function, so that only one look-up table is required instead of two.

Figure 4:
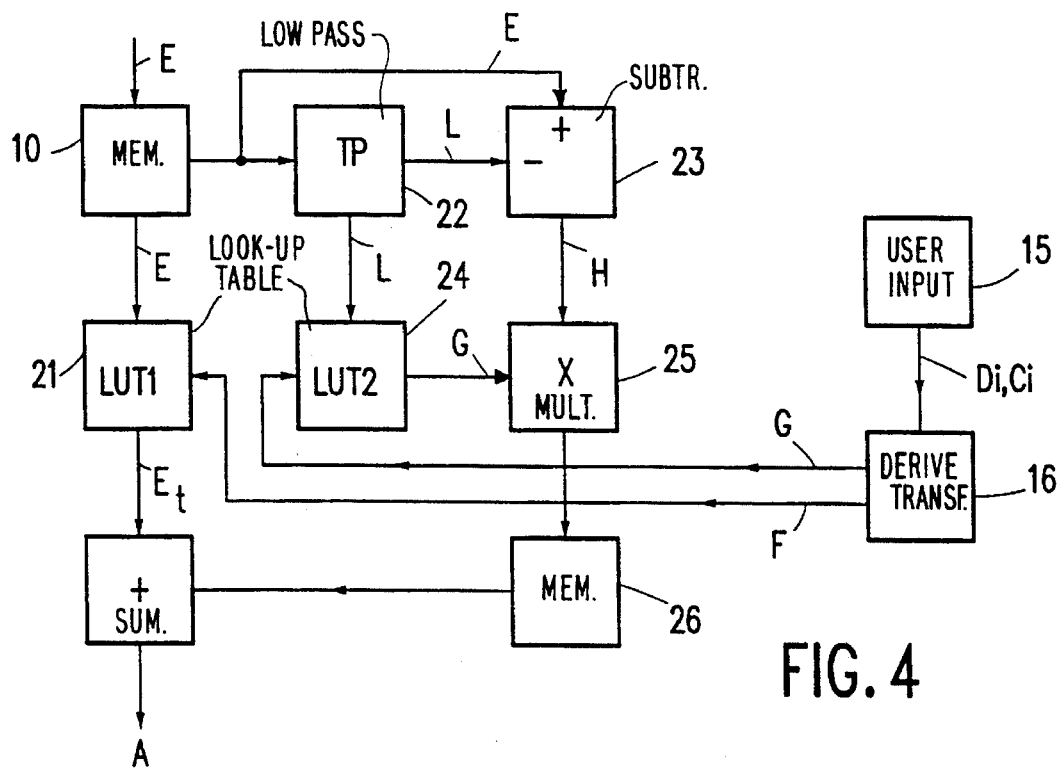
FIG. 4 shows a block diagram of a second version of the method of the invention.

FIG. 4 shows a block diagram of a further embodiment of the invention in which the formation of the input image values E and the processing of the output image values A are carried out in the same manner as in the block diagram shown in FIG. 1; therefore, the components required for this purpose have been omitted for the sake of simplicity of FIG. 4. However, whereas in the embodiment shown in FIG. 1 low-pass image values are derived from the input image values E, which low-pass image values are added to the input image values after transformation, in the embodiment shown in FIG. 4 weighted high-pass image values are added to the previously transformed input image values in conformity with the so-called Unsharp Masking method. More specifically, the modification in accordance with the invention of this known method involves the following:

The input image values E are subjected to a first transformation by means of a look-up table 21, so that transformed image values $E_t$ are obtained. Transformation is carried out in conformity with a transformation function F where the transformed image values $E_t$ are dependent on the input image values E in the same way as the density D is dependent on the logarithm of the exposure (log B) for the density function $D_i$ entered by the user. The transformation function F can thus be derived directly from the density function $D_i$.

Moreover, the input image values E are subjected to a low-pass filtering operation (block 22) for which the remarks given with reference to FIG. 1 hold as regards the size of the kernel of the low-pass filter. The low-pass image values L thus formed are subtracted from the input image values E (block 23). Because the input image values E contain information concerning small as well as large structures, whereas the low-pass image values L still contain information concerning large structures only, the image values resulting from the subtraction relate only to information concerning the fine structures. Thus, high-pass image values H are concerned. The high-pass image values H are multiplied by a weighting factor G which is dependent on the low-pass image values L (block 25).

Figure 2E:
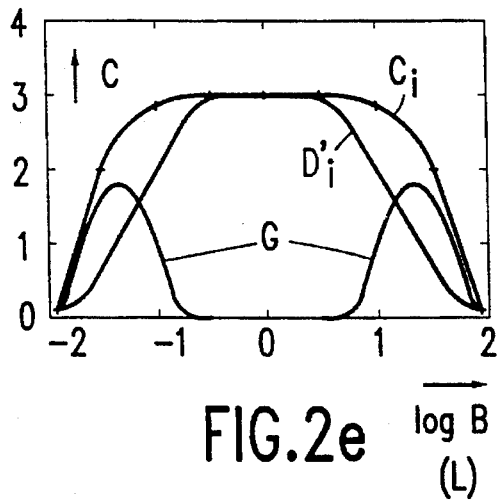

The derivation of the weighting factor G in dependence on the low-pass image values L will be described in detail with reference to FIG. 2e. Therein, the curve $C_i$ represents the contrast function entered by the user (see also FIG. 2a). The curve $D'_i$ corresponds to the correlated contrast function, i.e. the differential quotient of the density function $D_i$ in conformity with the logarithm B, so that $$D'_i = dD_i/d(\log B).$$

The function $D'_i$ thus determined corresponds to the contrast function which a film would have in the case of the density function $D_i$ entered by the user. The weighting factor G results from the difference between these two values, i.e.

$$G = C_i - D'_i.$$

It appears from FIG. 2d that for the abscissa values, for which the correlated contrast function $D'_i$ corresponds to the adjusted contrast function $C_i$, the weighting factor equals zero. For the small and the large abscissa values, however, $C_i$ is larger than $D'_i$, so that in this case G must be larger than 0 in order to ensure that the desired detail contrast is also obtained in this range.

Because a linear relationship exists between the input or the low-pass image values on the one hand and the relative logarithm of the exposure (log B) on the other hand, the weighting function G can be loaded into a look-up table 24 after appropriate scaling; this look-up table outputs the associated weighting factor G for each low-pass image value L. The high-pass image values H are multiplied by the relevant weighting factor G (block 25) and the product G×H thus obtained is stored (block 26). It also corresponds to a transformation which in this case, however, is dependent on two parameters, i.e. on H and on L.

Subsequently, the transformed input image values $E_t$ and the weighted high-pass image values $H_t$, associated with the same pixel, are added (block 27) and the image values A thus obtained are applied to the image output unit (not shown).

Figure 5:
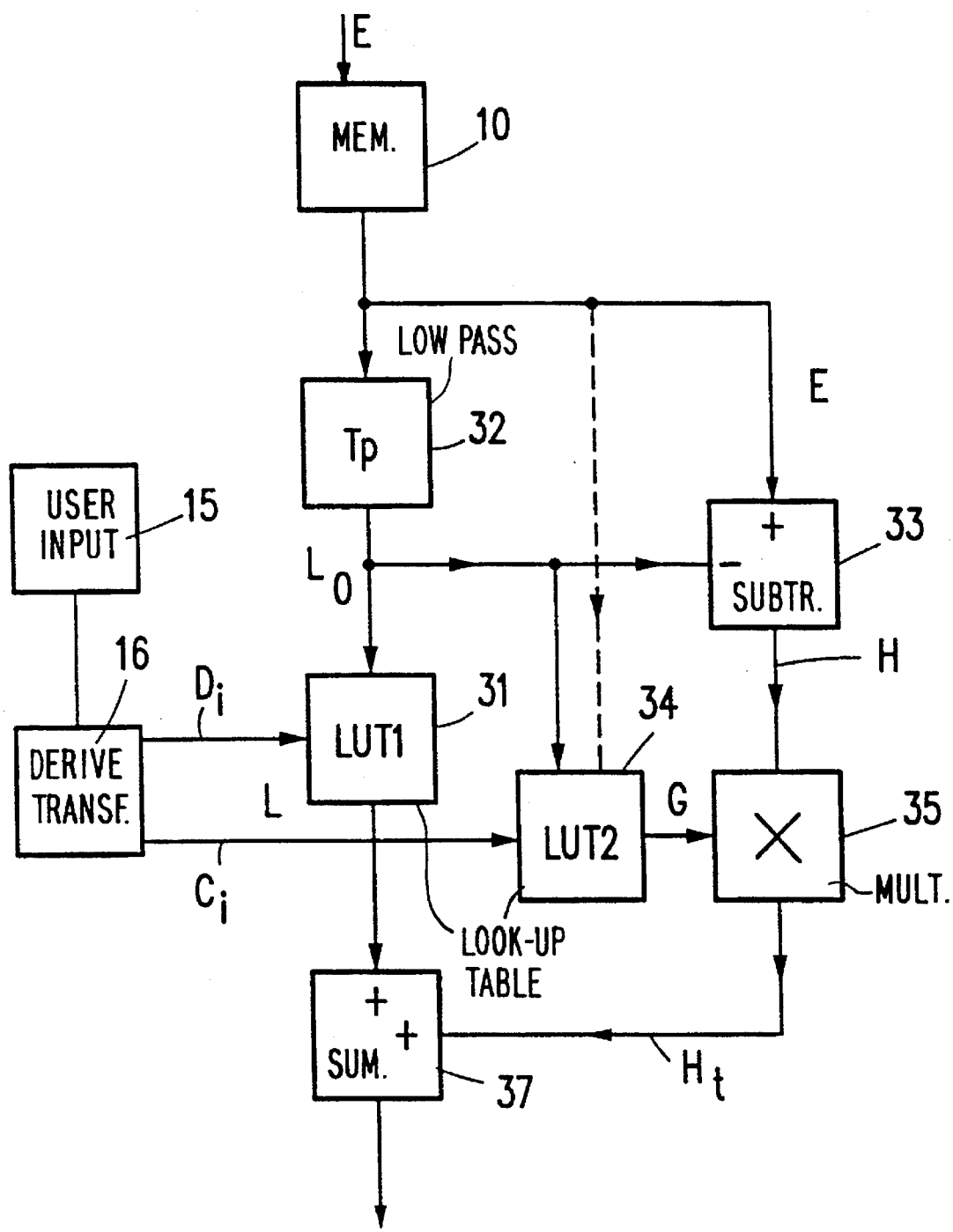
FIG. 5 shows a block diagram of a preferred version of the method of the invention.

FIG. 5 shows the block diagram of a preferred embodiment. The signal processing ahead of the input image value memory 10 takes place as described with reference to FIG. 1. However, whereas in the embodiments shown in the FIGS. 1 and 4 low-pass filtering (FIG. 1) or high-pass filtering (FIG. 4) takes place in only one of the two signal channels and no filtering takes place in the other signal channel, in the embodiment shown in FIG. 5 a high-pass filtering operation is performed in one signal channel and a low-pass filtering operation is performed in the other signal channel, each time with the same filter kernel. This offers the advantage that the transformation functions are no longer formed by a more or less complex calculation from the density function $D_i$ and the contrast function $C_i$, entered by the user, because in this special case these functions already represent the transformation functions.

Consequently, in one signal channel (block 32) a low-pass filtering operation is performed, after which the low-pass image values $L_o$ formed are subjected to a transformation where the transformation function corresponds to the density function $D_i$ entered by the user.

In the other signal channel the low-pass image values $L_o$ are subtracted from the input image values E (block 33), so that high-pass image values H are formed. This high-pass filtering operation is complementary to the low-pass filtering operation in the other signal channel, i.e. the addition of H and $L_o$ produces the input image values E. The high-pass image values are multiplied by a weighting factor G (block 35) which is extracted from a look-up table in which the contrast function $C_i$, i.e. the contrast as a function of the input image values, is stored. The contrast for the various image values (and hence the weighting factor) is determined from the look-up table 34 in dependence on the low-pass image value $L_o$ or, as is denoted by dashed lines, by the input image value E for the relevant pixel. Generally speaking, G is larger than 1 so that the detail contrasts are accentuated accordingly in the image to be displayed. The high-pass image values $H_t$ transformed by this multiplication are added pixel-by-pixel to the transformed low-pass image values each time associated with the same pixel. The image values A obtained by summing are applied to the image output unit (not shown).

It has been assumed thus far that the image output unit produces, for example a film image as a visible image; however, a monitor can also be used as the image output unit. In that case the user merely need enter a brightness function instead of a density function. The invention is not only suitable for converting X-ray images into a visible image, but also for processing image data acquired, for example by means of magnetic resonance or ultrasound methods. It is only essential that the small image structures have a smaller dynamic range than the large image structures.

We claim:

1. A method of displaying a spatial distribution of an X-ray image whose pixels are associated with digital input image values, comprising the following steps:

entering a contrast function and a density function desired for the display, processing the input image values in first and second signal channels, summing the image values formed in the signal channels, and applying sum image values thus formed to an output unit for forming a visible image, filtering the input image values in the first signal channel in order to generate low-pass image values or high-pass image values, and performing complementary filtering, or no filtering, in the second signal channel, transforming the image values formed in the second signal channel, or the sum image values, by means of a first transformation function, and transforming the image values formed in the first signal channel by means of a second transformation function, the first and second transformation functions being derived from the density function and contrast function entered in such a manner that, in the image displayed detail contrast is in conformity with the contrast function and brightness, or density, of coarse image structures varies in conformity with the density function.

2. A method as claimed in claim 1, wherein the first transformation function is formed by calculation of the integral over the contrast function entered and by adaptation of the integral to the maximum density or brightness of a visible image, the second transformation function is determined from a difference between the first transformation function and the density function entered for each time the same density or brightness, from the input image values there are formed low-pass image values, which are transformed in conformity with the second transformation function, the transformed low-pass image values are superposed on the input image values, and the sum image values thus produced are subjected to a transformation in conformity with the first transformation function.

3. A method as claimed in claim 1, wherein the first transformation function corresponds to the density function entered, the second transformation function is determined from the difference between the contrast function entered and a correlated contrast function, high-pass image values are derived from the input image values, the high-pass image values are multiplied by a weighing factor whose dependency on the low-pass image values corresponds to the second transformation function, the input image values are subjected to a transformation in conformity with the first transformation function, and the transformed input image values and the high-pass image values multiplied by the weighing factor are superposed pixel-by-pixel in order to form the output image values.

4. A method as claimed in claim 1, wherein the first transformation function corresponds to the density function entered, the second transformation function corresponds to the contrast function entered, high-pass image values are derived from the input image values, the high-pass image values are multiplied by a weighing factor whose dependency on the low-pass image values corresponds to the second transformation function, low-pass image values are derived from the input image values, the low-pass image values are subjected to a transformation in conformity with the first transformation function, and the transformed low-pass image values and the high-pass image values multiplied by the weighing factor are superposed pixel-by-pixel.

5. A method as claimed in claim 1 for the display of an X-ray image as a visible image, in which image values are formed which are proportional to the dose in the individual pixels, characterized in that the input image values are derived from these image values by a logarithmic transformation.

6. A device for displaying a spatial distribution of an x-ray image comprising that it comprises a) a detector device for converting location-dependent radiation intensity of an X-ray image into a data field consisting of digital input image values, b) means for separately entering a density function and a contrast function, c) means for deriving a first transformation function and a second transformation function from the contrast function and the density function, d) two signal channels for processing the input image values, e) a spatial filter in one of the signal channels for generating low-pass image values or high-pass image values from the input image values, f) a transformation device which processes the low-pass or high-pass image values so as to transform the low-pass or high-pass image values in conformity with the second transformation function, g) a superposition device for superposing the image values from the two signal channels, associated each time with the same pixel, in order to form sum signals, h) a second transformation device for transforming the image values present in the other of the signal channels or on the output of the superposition device in conformity with the first transformation function, and i) an image output unit for outputting the sum image values as a visible image.

* * * * *